May 4, 1965     B. J. MIDLOCK     3,182,311
LOW FREQUENCY RESPONSIVE VEHICLE DETECTOR
Filed March 24, 1960     2 Sheets-Sheet 1

INVENTOR.
BERNARD J. MIDLOCK
BY
*Edward H. Eames*
ATTORNEY

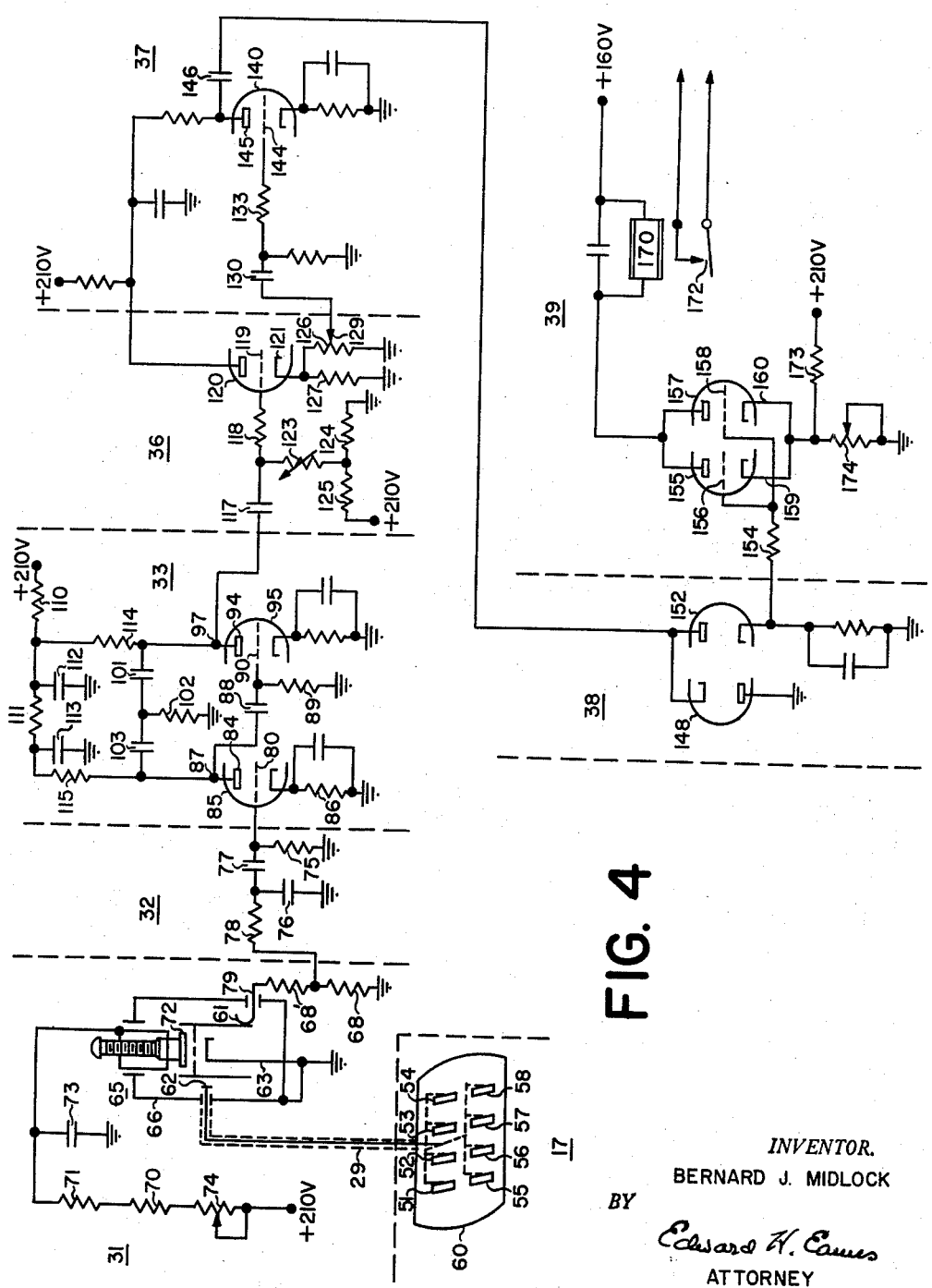

United States Patent Office

3,182,311
Patented May 4, 1965

3,182,311
LOW FREQUENCY RESPONSIVE
VEHICLE DETECTOR
Bernard J. Midlock, Norwalk, Conn., assignor, by mesne assignments, to Laboratory for Electronics, Inc., Boston, Mass., a corporation of Delaware
Filed Mar. 24, 1960, Ser. No. 17,406
2 Claims. (Cl. 343—7)

This invention relates to an improved vehicle detector employing directed ultra high frequency radio wave transmission and reception of the transmitted waves reflected from a moving object, the reflected waves being Doppler shifted in frequency effecting detection of such moving object.

More particularly the present invention relates to an improved radar vehicle detector including a novel frequency selective feedback amplifier circuit resulting in a more efficient operating unit in which is developed a narrow, sharp peaked band pass of subaudio frequencies with maximum amplification of the peak frequency and rapid decay of amplification of frequencies on both sides of the peak frequency.

Although the preferred form of the present invention herein disclosed and illustrated employs ultra high frequency radio wave generation, transmission and reception, other forms of radiant energy generation, transmission and reception, as for example supersonic or ultra sonic radiant wave energy may be used in lieu of the preferred form. Either of these methods provide a very short wavelength of energy which is sometimes referred to as microwave energy or microwaves.

From one aspect of the invention an improved radar vehicle detector is presented including a sharp peaked narrow subaudio frequency band pass amplifier capable of detecting vehicles traveling at a very slow rate of speed, of the order of two miles per hour, for example, which vehicle passes substantially under the radar unit and substantially ignores vehicles that pass other than substantially under the radar unit as well as substantially ignoring extraneous vibrations and spurious noises.

It has been found that a vehicle traveling at about one mile per hour will produce a Doppler shift frequency of approximately 7.31 cycles per second for a transmitted frequency of 2455 megacycles; thus a vehicle traveling at two miles per hour will produce a Doppler shift frequency of approximately 14.62 cycles per second for a transmitted frequency of 2455 megacycles and this frequency, modified by the cosine of the angle formed by the line of directional travel of the vehicle and the line between the vehicle and the antenna above the roadway, which cosine approaches zero as the vehicle passes directly under the antenna, will be reduced to and below 10 cycles per second, thus according detection of the vehicle by the improved radar vehicle detector as the 10 cycle per second Doppler shift frequency is sensed by the detector as described below.

From another aspect of the invention the combination of the components in the novel frequency selective feedback amplifier circuit is particularly adapted so as to make the use of such type circuit most practical in a radar vehicle detector from the standpoint of economy, availability and durability as well as providing components of smaller size, when compared with components previously employed in radar vehicle detectors, and thus providing a smaller, more compact unit of lower cost.

It has been found that at low frequencies in the audio and subaudio range suitable high-quality inductors tend to be expensive, bulky, heavy and susceptible to hum pick-up, whereas quality resistors and capacitors, generally employed in like low frequency circuits, may be inexpensive, smaller in size, lighter in weight and substantially free from hum pick-up.

By use of standard resistors and capacitors as components in a filter network, the components being of non-critical values, and by employing the impedance of the anode to cathode circuit of the triode of the first stage of a two stage amplifier section in parallel with the plate load resistance of the triode as part of the filter network, cooperation between the filter network, including the first stage of the amplifier, and the second stage of the amplifier is obtained to provide a signal feedback from the output of the plate circuit of the second stage of amplification into the input of the grid circuit of the second stage, the signal feedback being shifted in phase approaching 180°, either more than or less than 180°, as desired, between the output at the plate circuit and the input of the grid circuit of the second stage, thus providing a high degree of amplification at the desired frequency, without self oscillation.

Parallel plate loading, through capacitor coupling, is applied to the plate circuit of the second stage to provide means of adjusting the peak band width to additionally reduce possibility of self oscillation thus providing a stable, frequency selective feedback amplifier circuit with a high degree of amplification of the desired frequency in the audio or subaudio range.

In the preferred embodiment, three stages of electrical phase shift are substantially accomplished in phase shift stages approaching 60° each, thus providing an electrical phase shift approaching, but less than 180° between the output end of the second stage of amplification and the input to the grid circuit of the same stage of amplification, as more fully described below.

The present frequency selective feedback circuit provides high gain with increased electrical stability, thus providing in effect a high stability-low noise-high gain detector circuit with a sharp, narrow peaked bandpass at low frequencies in the audio and subaudio range, for example.

It is a general object of the invention to provide an improved radar vehicle detector of compact and low cost construction.

Another object is to provide an improved radar vehicle detector for detection of very slow moving vehicles as well as more rapidly moving vehicles which pass substantially under the radar vehicle detector and to substantially ignore vehicles which pass substantially to the one side or the other of the radar vehicle detector, as in adjacent traffic lanes on either side for example.

A further object is to provide an improved radar vehicle detector including a sharply defined frequency bandpass amplifier for the detection of very slow moving vehicles as well as rapidly moving vehicles with substantial elimination of undesired vibrations and hum outside the frequency bandpass range.

A further object is to provide an improved detector of moving objects employing transmission of microwaves at an angle to the path of such objects and comparison with received waves reflected from such objects to derive a low Doppler beat frequency, and including a tuned regenerative amplifier for selective amplification of desired such low frequency.

A further object is to provide a frequency selective feedback amplifier circuit particularly adapted for use in a radar vehicle detector in which an electrical phase shift approaching 180° is developed through the use of a resistance-capacitance combination network including the anode to cathode impedance of the first stage of a two stage amplifier in which the feedback signal is applied to the triode of the second stage of the amplifier.

Another object is to provide a frequency selective amplifier circuit, for selection of frequencies in the subaudio range, with high gain, low noise and high stability so as to be substantially free from oscillation.

Other objects will be apparent from the following description and appended claims.

Vehicle detectors of various types are well known in the field of traffic control and associated fields. The use of one type vehicle detector, the radar vehicle detector, has several advantages over treadle switches and magnetic detectors.

The radar vehicle detector, as well as being efficient, is easy to install and is, in general, more easily maintained than treadle switch type and magnetic type detectors. The latter types are most generally imbedded in the roadway and offer certain problems of removal or resetting and the like as when repairs and/or resurfacing of the roadbed are in process in the location of the detectors in the roadbed.

Installation of a radar vehicle detector may be made by suspending the unit over the roadway by use of a span wire or a support from a pole or post. The cost of such installation is low when compared with installation of treadle switch and magnetic type vehicle detectors. Construction or repairs on the roadbed does not affect the installation of the radar detector and removal for maintenance or transfer to another location is simplified by mere removal of the unit from its suspended position.

Such installation of such unit accords accessibility and ease of transfer from one installation to another.

The reduction of cost of production by use of less expensive components coupled with more efficient operation and the production of a more compact unit are offered herein thus adding further advantage of the present radar vehicle detector over other forms of vehicle detector units as well as improving the radar vehicle detector of the type heretofor employed for vehicle detection.

Referring now to the several drawings illustrating a preferred embodiment of the invention:

FIG. 4 shows a schematic circuit diagram of a preferred form of the invention.

Figure 1:
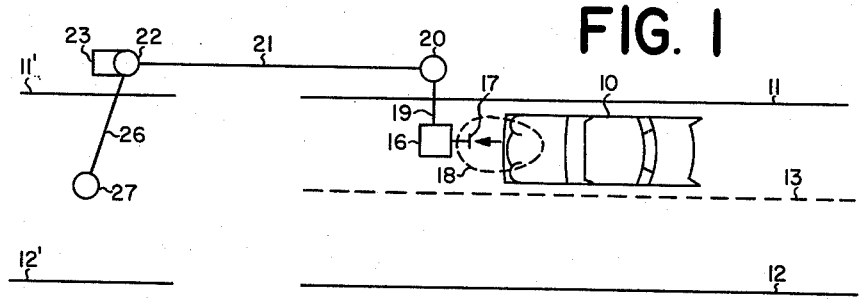
FIG. 1 shows a plan view of a section of roadway with a radar vehicle detector on the approach to a signal in accordance with one aspect of the invention.

Referring to FIG. 1 in more detail a vehicle 10 is shown schematically proceeding to the left of the figure, as indicated by the arrow, along a roadway, the edges of which are indicated at 11 and 12 and which center line is indicated at 13.

Supported over the roadway is an ultra high frequency radio antenna 17, illustrated as of the dipole type. This antenna is associated with a box or housing 16 which may support or contain the antenna unit and its associated electrical apparatus as shown in FIGS. 3 and 4 for example.

The antenna unit 17 is supported over the side of the roadway on which it is desired to detect approaching vehicles as for example, over the right side of a roadway in which traffic drives to the right, as illustrated by the vehicle 10, approaching the signal 27. The antenna unit on a two way roadway, as illustrated, is preferably mounted slightly nearer the side of the road than the center line of the road by means of a supporting arm and connections 19 from a pole or post 20, and directs a beam of ultra high frequency radio waves downward to produce an approximately elliptical pattern 18 on the same side only of the roadway and with its long axis substantially parallel to the roadway and extending from approximately directly under the antenna unit outward toward approaching traffic.

The edges of the roadway 11 and 12 are indicated as broken and extending to the left at 11' and 12' to indicate some distance to the signal 27, which may indicate a traffic signal, as for example traffic right-of-way signal associated with an intersection of the road 11–12 with another road, not shown. The antenna detector unit 16–17 is illustrated as connected via line 19 and line 21 to a pole 22 and associated signal controller 23 and thence along line 26 to control the signal 27. The line 26 may represent a support for signal 27 from a pole or post 22. It will be appreciated that under some circumstances the radar detector unit 16–17 might be connected directly to control the signal, and in other circumstances might be connected to the signal controller 23 which in turn would control the signal as part of a traffic control system. In the latter case the system might involve the use of additional radar detector units for other or all of the approaches to an intersection for control of the traffic signal.

Figure 3:
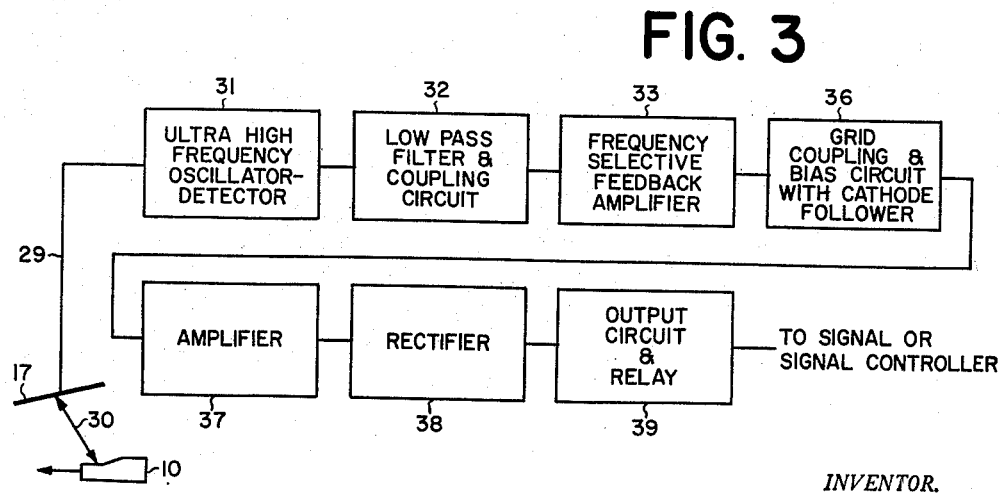
FIG. 3 shows a block diagram of a preferred form of the invention.

It will be appreciated that the antenna unit 17 and its associated electrical circuit apparatus of FIGS. 3 and 4 might be mounted as one unit over the roadway with only its output connection extended to the controller 23 or signal 27, or the antenna unit 17 alone might be mounted over the roadway and the remainder of its associated apparatus located at the side of the roadway on the pole 20, for example, or the electrical apparatus might be suitably divided between the pole and over the roadway to permit some adjustment of sensitivity for example, from the side of the road.

Figure 2:
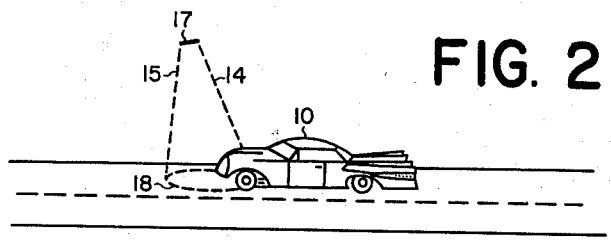
FIG. 2 shows an enlarged elevation view of the radar detector antenna in relation to a roadway and a vehicle thereon.

The preferred relation of the antenna unit to the roadway, angled slightly toward approaching traffic is illustrated more fully in FIG. 2. This positioning of the antenna enables the detector unit to derive an actuation from an approaching vehicle on the approach side of the roadway, and to substantially disregard vehicles on the opposite side of the roadway.

However, it should be noted that the antenna may also be angled away from approaching traffic to enable the detector unit to derive actuation from receding vehicles. Whether the antenna is mounted in its preferred relation to the roadway or, in the alternative, away from approaching traffic, the relation between the antenna unit with respect to the horizontal will be substantially the same except for being angled in the opposite direction. The beam pattern will extend from substantially under the antenna forward toward the intersection in the direction of traffic flow.

It will be noted that the antenna unit is mounted at a slight angle to the horizontal, which is preferably of the order of 15 degrees, and the antenna beam pattern between half power points is approximately 30 degrees between the lines 14 and 15, the line 15 representing one edge of such beam pattern extending substantially vertically downward from the antenna to the roadway and the outer edge 14 extending outward along the roadway toward approaching vehicles at an angle of approximately 30 degrees, thus providing the approximately elliptical pattern 18 of the radiant wave energy within one side of the roadway on which it is desired to detect the vehicles. It will be appreciated that there is a diminishing amount of radiant wave energy somewhat outside this pattern but the sensitivity of the electrical apparatus can be adjusted, in association with its particular frequency response feature described, to substantially eliminate detection of vehicles on the opposite side of the roadway. The entire assembly is adjusted to respond ordinarily to a moving vehicle approximately at and somewhat beyond the position shown in FIGS. 1 and 2 for example, although it will be understood that this may vary somewhat in actual practice with different types of vehicles and conditions, and in this connection a suitable height for mounting the antenna unit has been found to be about 16 feet above the roadway, for example.

Although the application is presented with reference to use of the radar vehicle detector over one lane of traffic the sensitivity may be adjusted so as to cover two traffic lanes where the radar vehicle detector is suspended between the lanes and the sensitivity of the unit is expanded so that the radiant wave energy substantially covers both lanes.

Referring now to FIG. 3, a block diagram of the preferred form of the invention is presented with the ultra high frequency antenna unit 17 illustrated at an angle to transmit a radio beam downward and to receive wave energies reflected back from vehicle 10 along line 30, the transmitted and received ultra high frequency energies both traveling on the common coaxial line 29, the transmitted energy being derived from the ultra high frequency oscillator detector 31.

It will be seen, by reference to FIG. 4 that the oscillator detector, as will be more fully described below, employs a conventional coplanar triode of the lighthouse type, commercially designated as 2C40, for example, with a reentrant associated cavity resonator. Grid pick-off of the Doppler shift frequency difference is the technique that may be employed in the ultra high frequency oscillator detector. Grid pick-off of the Doppler shift frequency difference in an ultra high frequency oscillator detector is more fully explained in my copending application Serial Number 752,786, filed August 4, 1958, under the title, "Control," now U.S. Patent No. 3,140,485.

The signal picked off the oscillator detector tube via the grid pickoff technique is fed into a low pass filter 32 which attenuates high frequencies to substantially limit the frequencies applied to the grid of the frequency selective feedback amplifier 33.

The filtered signal is fed into a frequency selective amplifier section 33, which amplifier section is of particular concern to this application.

The section 33, in general includes a frequency selective feedback amplifier from which is derived a very narrow and sharp peaked band pass with maximum regeneration at about 10 cycles, for example, the peak frequency, and rapid decay of amplification on both sides of the peak frequency.

The filtered and amplified signal is fed into a grid coupling and grid bias section with cathode follower 36, and into an amplifier section 37.

The amplifier section 37 feeds into the rectifier 38 which rectifies the filtered and amplified signal into a direct current which is proportional to the filtered and amplified alternating current signal. The direct current voltage is applied to the output circuit 39 including two parallel connected triodes with a relay in series with the parallel connected plates to a direct current supply.

The relay of section 39 controls a set of contacts to close upon energization of the relay. The contacts may, as desired, be connected to a repeater relay circuit or to a signal or signal controller, or other system.

Attention is now directed to FIG. 4, the schematic circuit diagram of the preferred form of the present invention. It will be observed that the circuit diagram is separated into sections by broken lines. Each section has an underlined number. These numbers are identical to the numbers found in FIG. 3 and associated individually with a part of the block diagram. Thus each section of the circuit diagram in FIG. 4 illustrates the circuit that is included in the block in FIG. 3 where the sections in FIG. 4 and the blocks in FIG. 3 are numbered identically.

Referring to FIG. 4, it will be seen that:

The antenna assembly 17 is illustrated schematically at the lower left of the drawing, the antenna assembly including two columns of four dipoles each side by side, from dipole 51 to 54 on the top and from dipole 55 to 58 on the bottom all mounted on the reflector backing plate 60.

In its preferred form the antenna is arranged with the individual dipoles for horizontal polarization and stacked vertically in two columns of four. The backing plate may be angled about 15° off the horizontal toward approaching traffic for example, thus directing a UHF beam downward at an angle of about 15° from the vertical toward the surface of the road surface producing the elliptical pattern illustrated in FIGS. 1 and 2.

In this connection it may be desired to direct the UHF beam downward away from approaching traffic and thus accord detection of a vehicle as it passes beyond the vertical line between the antenna and the roadway.

The antenna assembly is connected via coaxial line 29 to the coupling element 62 in the cavity resonator of the ultra high frequency oscillator tube 65. This tube is illustrated as the conventional coplanar triode of the lighthouse type commercially designated 2C40, for example, with reentrant type associated cavity resonator 66.

My U.S. Patent 2,797,324, issued June 25, 1957, under the title "Space Resonant System," includes a description and diagrams of the lighthouse type 2C40 tube and its associated cavity resonator.

This oscillator tube 65 generates the ultra high frequency energy which is transmitted via wave guide or coaxial line 29 to the antenna assembly and also receives the reflected wave energy as Doppler shifted in frequency, modified by the cosine factor with respect to a speed of the vehicle. Thus the generated and reflected wave energies are mixed in the oscillator-detector 31, and the Doppler beat frequency, that is the Doppler shift frequency difference as modified by the cosine factor, of the angle between the line of motion of the vehicle and the path of the ultra high frequency energy from the antenna to and from the vehicle, will appear as a periodic change in grid current on the line 79. The grid connector 61 is connected via line 79 to resistor 68–68' which is connected to ground and therefore connected to the cavity resonator 66 or cathode 63. The resistor 68–68' between grid connector 61 and ground serves to provide grid leak bias for operation of the oscillator tube 65.

Superimposed upon the grid bias voltage is found, developed from and varying in accordance with the Doppler beat frequency, an audio or subaudio frequency, the difference frequency between the generated ultra high frequency, 2455 megacycles per second, for example, and the Doppler shifted frequency. A portion of this varying voltage is applied to resistance 78 and across capacitor 76 to ground. This resistance-capacitance combination 78 and 76 forms a low pass filter to substantially attenuate frequencies above 20 cycles per second, for example. The capacitor 77 provides coupling which substantially passes the subaudio frequencies, below 20 cycles per second, for example, which signal is applied across resistance 75 thus applying the low Doppler beat frequency to the grid 80 of the first stage amplifier of the frequency selective feedback amplifier section 33.

B+ voltage, of the order of 210 volts direct current for example, is applied to the anode 72 of the lighthouse tube through a potentiometer 74 and two resistors 70 and 71 in series, with capacitor 73, in parallel, employed as a filter capacitor.

The cathode 63 is connected directly to ground and to the cavity resonator 66 thus effectively connecting the cavity resonator to ground.

The grid pickoff technique illustrated in FIG. 4 may be generally described thus, the generated wave energies present in the cavity resonator 66 and the reflected wave energies conducted to the cavity resonator via the antenna assembly 17 are mixed in the oscillator detector tube 65 and the resulting Doppler beat frequency appears as a periodic change in anode current and in grid current at grid pickoff 61.

The resulting Doppler beat frequency is found superimposed upon the normal grid bias voltage which voltage appears across the grid leak bias resistor 68–68'.

The signal is filtered and amplified as explained below.

The signal applied to grid 80 of tube 85 provides a partially filtered A.C. potential on grid 80 which signal is amplified by tube 85. The amplified A.C. signal at point 87 is fed through capacitor 88, in combination with resistor 89 which combination has a filtering effect on the A.C. signal for attenuation of very low frequencies. The signal is applied to grid 90 of tube 95 which signal is amplified by conduction of the tube 95.

The signal applied to point 97 is the varying low Doppler shift difference frequency, filtered and amplified and particularly applied to the tuned frequency selective feedback network. By action of the resistor/capacitor (RC) combination 102 and 101 the signal is shifted in phase, the phase shift approaching 60°, and applied to the next RC combination of capacitor 103 and the anode to cathode circuit of tube 85 in parallel with resistor 115. This RC combination again shifts the phase of the signal, in the same direction, approaching 60°. The signal is then applied to the RC combination 89 and 88 and is caused to be shifted a third time in the same direction, the shift approaching 60°. The signal from the latter RC combination is applied to the input of grid 90.

Thus the combination of the tuned filters have fed back a signal which has been shifted in phase approaching 180° from the output of tube 95 to the input of the grid 90 of tube 95, the feedback signal is added to and superimposed upon the normal output of tube 85, with the signal feedback being slightly out of phase with such output, for the frequency which it is desired to pass and amplify.

Adjustable resistor 123 provides an output load through capacitor 117 to plate 94 of tube 95 and serves as an adjustment for selection of the desired width of the peak of the band pass. Adjustable resistor 123 also serves, in conjunction with resistor 118 and potential dividers 124 and 125, to provide a positive grid bias to permit extension of the operation range of the cathode follower 120.

In the preferred arrangement the filter network is tuned for peak passage of a 10 cycle per second (c.p.s.) signal with severe attenuation above 12 c.p.s. and below 8 c.p.s. so that as the applied signal approaches the selected frequency, 10 c.p.s., for example, its maximum regenerative effect is obtained and the maximum feedback signal of 10 c.p.s. is thus applied to the grid 90 adding to the amplitude of the output of the first stage of the amplifier with both signals in close phase relationship with each other to provide a high degree of amplification.

It has been found that maximum amplification with desired bandwidth through the use of such frequency selective feedback amplifier for a 10 c.p.s. signal may be obtained with the following typical values, without limiting the circuit to such values. Tubes 85 and 95 may be in the form of a dual triode commercially designated as 12AX7 while resistor 86 may be valued at 6,800 ohms and its shunting capacitor at 100 microfarads. Capacitor 88 and resistance 89 may be valued at .047 microfarad and 360,000 ohms respectively, with the cathode resistor of tube 95 and its shunting capacitor valued at 6,800 ohms and 100 microfarads. Capacitor 101 and resistance 102 may be valued at .02 microfarad and 160,000 ohms respectively while capacitor 103 and resistor 115 may be valued at .02 microfarad and 390,000 ohms respectively. A direct voltage of 210 volts may be applied through resistors 124 of 20,000 ohms and 125 of 390,000 ohms with the active resistance of adjustable resistor 123 of 1 megohm feeding into coupling capacitor 117 of .047 microfarad.

It should be understood that although the selective feedback amplifier, in its preferred form is tuned for a peak frequency of 10 c.p.s., such selective feedback amplifier circuit may be tuned to other audio or subaudio frequencies with like effect, depending on the minimum vehicle speed it is desired to detect and on the angle of the beam to the path of the vehicle and also depending on the wavelength of the transmitted wave, for example.

Thus for electromagnetic waves of about 9800 megacycles for example the wavelength would be about one-fourth of that for 2455 megacycles and the feedback amplifier might be peaked at about 40 c.p.s., and for supersonic waves of about 22000 c.p.s. having a wavelength of about five hundredths of one foot the feedback amplifier might be peaked at about 80 c.p.s., for example.

The filtered and amplified low frequency signal is applied through capacitor 117 and through grid resistor 118 to grid 119 of cathode follower 120 in section 36.

The cathode 121 is connected to ground via resistor 127 and potentiometer 126 in parallel. Adjustment of potentiometer 126 via tap 129 provides increased sensitivity, as desired, of the vehicle detector, thus expanding or contracting its zone of sensitivity to accord increased or decreased coverage on a roadway.

It is obvious that the potentiometer 126, including its tap 129 may be remotely located merely by extending the leads between the cathode 121 and the potentiometer and the tap 126 and coupling capacitor 130, while returning the one side of the potentiometer to ground.

The tube 140 of amplifier section 37 serves to amplify the signal applied to the grid 144 via resistor 133. The amplified signal is applied from plate 145 through coupling capacitor 146 to the rectifier section 38, including tubes 148 and 152 connected for doubler action. The rectified signal applied across resistance 154 is applied to the parallel connected grids 156 and 158 of tube sections 155 and 157 which signal overcomes the cathode bias applied in parallel to both cathodes 159 and 160.

The 210 volt supply applied between resistor 173 and potentiometer 174 to ground, holds the tube sections 155 and 157 in a quiescent state in absence of a signal applied to the grids 156 and 158.

So long as a signal is applied through resistor 154 and thus to grids 156 and 158 of sufficient magnitude to cause conduction of the tube sections of tubes 155 and 157, plate current will be drawn by the tube or tubes which will energize the relay 170, in the plate circuit of the parallel connected tubes.

It will be appreciated that the output pulse energizing relay 170 may be connected to a counter or computer, or the contacts 172 of relay 170 may be connected to a computer or other counting device or device into which it is desired to apply an electrical pulse, for traffic response or control purposes.

Thus as a vehicle passes substantially under the radar detector and the low Doppler shift frequency difference is produced through reflection of the transmitted signal by the vehicle, the Doppler shift frequency difference is sensed, filtered and amplified, in the subaudio range of 10 cycles per second, for example, the amplified signal is applied to the rectifier which rectified signal is applied to the grids of the tube sections and causes plate current to flow thereby energizing the relay producing a pulse for each such vehicle.

Upon energization the relay 170 will, as illustrated, close its contacts 172 which contacts may be employed to close a repeater or other type of circuit.

It may be desired to open a circuit upon energization of relay 170, which can be accomplished by inverting the contacts 172 and making the contacts "break" contacts instead of "make" contacts upon energization as illustrated.

While applicant has particularly discussed the use of high frequency radio waves as a transmitted signal it is obvious that ultra sonic or supersonic waves may be transmitted. Also a transistor could be substituted for a vacuum tube to perform similar functions.

In summary a single regenerative amplifier is responsive to audio signals within a range of 8 to 12 cycles per second. Any signal below this frequency range produced for example by a swaying of the radar detector at its mounting or of its associated wiring will not produce any response. Signals above this range are also limited for example sixty cycle hum. Within this narrow range of only 4 cycles applicant by means of the disclosed Doppler system is capable of producing a response for both slow speed vehicles at two miles per hour and for high speed vehicles including one hundred miles per hour. This result occurs because vehicles having various speeds will in passing at some point provide a reflected Dopper signal and a resultant beat frequency within the bandwidth of the regenerative amplifier. Such point will be within the beam when the component of the vehicle speed in the direction of the transmitter-receiver will be at sufficient angle to provide a sufficiently low frequency Doppler signal within the amplifier band pass.

The preferred form of the invention has been described employing ultra high frequency radio wave generation, transmission and reception with an ultra high frequency of 2455 megacycles as an example that may be used as part of the detection means. Obviously the ultra high frequency radio wave energy generated and transmitted may be substantially increased in frequency, up to some ten times such 2455 megacycles for example if desired.

If, for example, the generated and transmitted ultra high frequency radio wave energy of the detection means were increased in frequency to approximately ten times the frequency of the example frequency of 2455 megacycles, then the Doppler shift frequency produced by reflection from a moving object would be increased in frequency linearly over the Doppler shift frequency produced by the same object moving at the same speed reflecting ultra high frequency radio waves at the example frequency of 2455 megacycles.

Therefore if a detection means, generating and transmitting a somewhat higher frequency than 2455 megacycles were to be employed in the present invention it may be necessary to increase the peak frequency of the band pass as well as to widen the band pass provided by the regenerative amplifier and filter depending upon the amount of increase in frequency used.

When the cosine factor is taken into consideration, as previously explained, the Doppler effect is reduced somewhat so that for a detection means generating and transmitting a frequency of, for example, 24,550 megacycles a regenerative amplifier and filter providing a band pass of for example, from 50 cycles per second to 140 cycles per second, with the band pass peaked at 95 cycles per second may be found sufficiently high in frequency and sufficiently wide to provide for detection of from very slow moving vehicles to very fast moving vehicles passing substantially under the antenna.

Although the preferred form of the invention has been described as employing the transmission and reception of ultra high frequency radio wave energy or microwave energy for developing the Doppler beat frequency used in the present system of detecting moving vehicles and providing an output pulse for providing improved response to or indication of vehicle traffic, other radiant wave energy means might be employed to develop a Doppler beat frequency in a similar manner as by the transmission and reception of supersonic or ultra sonic waves in air, the latter waves being similar to sound waves above audible frequencies for example.

Supersonic waves of frequency of the order of 25,000 cycles per second may be directed in divergent beam form as illustrated in FIGS. 1 and 2 and the mixture of transmitted and reflected waves will provide a Doppler beat frequency of the order of ten times that obtained with the example frequency of 2455 megacycle radio wave transmission described above, but comparable to the beat frequency obtained from radio wave transmission at 25,000 megacycles, which has comparable wave length, for example. Radio waves of the length produced by the frequencies of 2455 megacycles and above are normally considered microwaves. Thus the electrical signal of Doppler beat frequency derived from rectification of the mixture of electrical waves corresponding to the supersonic transmitted waves and the electrical waves corresponding to the received reflected waves may be applied to the circuitry corresponding to the block diagram to the right of the oscillator-detector 31 of FIG. 3 in the same manner as that from the mixture of transmitted and reflected radio waves as described above.

A vehicle detector for employing supersonic radiant energy detection means may be similar in many respects to the vehicle detector employing ultra high frequency radio energy detection means represented in block form in FIG. 3. The oscillator-detector associated with supersonic radiant energy detection means may be of the ordinary type oscillator-detector for generating an electrical frequency of the order of 25,000 cycles per second, or 25 kilocycles while lead 29 would provide connection to an electrical acoustical transducer capable of converting the generated electrical frequency of 25 kilocycles to supersonic waves of comparable frequency, which supersonic waves may be considered microwaves, and directing these supersonic waves through air in the form of a beam. Such electrical acoustical transducer would be employed in lieu of the antenna represented by 17 in FIG. 3.

Reception of the projected supersonic waves, Doppler shifted in frequency may be made by an acoustical-electrical transducer capable of receiving supersonic waves within the general range of frequency of the projected supersonic waves which converts the received supersonic waves now Doppler shifted in frequency into electrical waves of comparable frequency. The electrical waves, comparable in electrical frequency to the frequency of the received supersonic waves may be applied to the oscillator-detector in which the Doppler beat frequency is developed and detected.

As pointed out above, the cosine factor, in passage of the vehicle through the beam at an angle, reduces the Doppler frequency shift between the transmitted and received waves. This reduces the frequency band width required in the transducer and oscillator parts of supersonic systems, in which the frequency shift would otherwise be a substantial fraction of the transmitted frequency.

Processing this Doppler beat frequency would be similar to that described above relative to the vehicle detector employing radio wave detection means. This alternate method would then provide a vehicle detector for employing supersonic detection means to provide a pulse in response to or indication of vehicle traffic.

While the preferred use of this invention is in detecting automobile vehicles it should be clear that the word vehicle may include airplanes. In this connection the transmitting unit may be mounted within a runway, alongside a runway or even off the end of the runway in the direction of approaching aircraft or of departing aircraft. In either position a microwave beam may be directed upward, or across the runway or in the direction of the runway so long as the beam is directed to intercept the aircraft at some point in its path where the cosine angle factor produces a low Doppler frequency.

Applicant would also point out that while the three resistor capacitor networks in the regenerative amplifier each provide substantially a sixty degree phase shift, the two networks having capacitors 101 and 103 provide a phase shift greater than sixty degrees while capacitor 88 and resistor 89 provide less than sixty degrees. This combination of values besides providing regeneration within a narrow band, also limits the response below and above the regenerative band. It will be noted that 88 and 89 are in the input circuit of tube 95 and also form part of the feedback circuit. Hence the value of capacitor 88 forms a high reactance to further limit particularly the low frequency end of the band.

Thus among others, the several objects to the invention as specifically aforenoted, are achieved. Obviously, numerous changes in construction and rearrangement of parts might be resorted to without departing from the spirit of the invention within the scope of the claims.

I claim:
1. A traffic detection apparatus comprising in combination high frequency transmitting and receiving means including an oscillator-detector circuit for transmitting high frequency waves in a beam at an angle to a traffic path to be reflected from vehicles moving along said path through said beam, said oscillator-detector circuit generating said transmitted waves and receiving Doppler modified waves reflected from the vehicle and mixing these reflected waves with the oscillator generated waves to detect therefrom low frequency Doppler beat frequency output signals, a low pass filter circuit coupled to the output of said oscillator-detector circuit for receiving and passing the low frequency detected signals as an output, first and second three-electrode amplifiers in which internal impedance to current flow between the first and second electrodes as an output is controlled by potential of the third electrode with respect to the second electrode as an input, each of said first and second amplifiers having substantially 180-degree internal phase shift between input and output, the input of said first amplifier being coupled to the output of said low pass filter circuit to receive the low frequency signals passed therefrom, a circuit including an external resistance coupling said first electrode of said first amplifier to a direct current supply one terminal of which serves as a reference, a combined low frequency interstage coupling and regenerative feedback circuit coupling said first and second amplifiers as successive stages of a low frequency selective alternating current amplifier circuit and providing substantially but not exactly 180-degree external phase shift between the output and input of said second amplifier at a substantially predetermined said low frequency in the low audio to sub-audio range to provide regeneration without sustained oscillation in said amplifier circuit in said low frequency, said combined circuit comprising three series capacitance-parallel resistance phase shift networks coupled in series to provide substantial respective parts of said substantially 180-degree phase shift, the first said network having a capacitor with one side coupled to said first electrode of said second amplifier and having a resistor coupled between the other side of said capacitor and said reference, the second of said networks having a capacitor coupled between said other side of the first network capacitor and said first electrode of said first amplifier and said second network including as its network resistance the internal impedance between the first and second electrodes of said first amplifier in parallel with said external resistance to said reference, and the third of said networks having a capacitor coupled between said first electrode of said first amplifier and said third electrode of said second amplifier and having a resistor coupled between said third electrode of said second amplifier and said reference, whereby said third network serves as an interstage coupling circuit for said amplifiers, and a relay control circuit coupled to the output of said second amplifier to be controlled thereby.

2. Traffic detection apparatus as in claim 1 in which said relay control circuit includes an output amplifier normally biased to a quiescent condition in absence of substantial signal at its input and becoming conducting to provide an output for control of a relay or the like in response to such substantial signal overcoming said bias, a further alternating current amplifier, a rectifier circuit coupling the output of said further amplifier to the input of said output amplifier, and a control circuit coupling the output of said second amplifier to the input of said further amplifier, said control circuit including sensitivity control means for applying an adjustable part of the output of said second amplifier to the input of said further amplifier.

References Cited by the Examiner
UNITED STATES PATENTS

| | | | |
|---|---|---|---|
| 2,367,711 | 1/45 | Bode | 330—176 |
| 2,383,984 | 9/45 | Oberweiser | 330—107 |
| 2,566,333 | 9/51 | Huntoon | 330—107 X |
| 2,593,071 | 4/52 | Sunstein et al. | 343—9 |
| 2,629,025 | 2/53 | Roberts | 330—104 |
| 2,965,893 | 12/60 | Barker | 343—8 |
| 3,059,190 | 10/62 | Hafler | 330—109 |

CHESTER L. JUSTUS, *Primary Examiner.*

FREDERICK M. STRADER, *Examiner.*